United States Patent
Sankaran et al.

(10) Patent No.: US 9,622,143 B1
(45) Date of Patent: Apr. 11, 2017

(54) ACCESS POINT NAME MAPPINGS FOR A LAYER TWO WIRELESS ACCESS NETWORK

(71) Applicant: Juniper Networks, Inc., Sunnyvale, CA (US)

(72) Inventors: Krishna Sankaran, Milpitas, CA (US);
Prasad Chigurupati, Cupertino, CA (US); Pradip De, Burlingame, CA (US); Santosh Gupta, Fremont, CA (US); Rajashekhar Reddy, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 247 days.

(21) Appl. No.: 13/957,228

(22) Filed: Aug. 1, 2013

(51) Int. Cl.
*H04W 40/02* (2009.01)
*H04W 76/02* (2009.01)
(Continued)

(52) U.S. Cl.
CPC ......... *H04W 40/02* (2013.01); *H04L 12/4641* (2013.01); *H04L 61/3075* (2013.01);
(Continued)

(58) Field of Classification Search
None
See application file for complete search history.

(56) References Cited

U.S. PATENT DOCUMENTS 8,127,350 B2   2/2012   Wei et al.
8,339,959 B1   12/2012  Moisand et al.
(Continued)

FOREIGN PATENT DOCUMENTS

WO    WO 2012175544 A1 * 12/2012

OTHER PUBLICATIONS

3GPP TR 23.852 V1.0.0 (Dec. 2011), "3rd Generation Partnership Project; Technical Specification Group Services and System Aspects; Study on S2a Mobility based on GTP & WLAN access to EPC (SaMOG); Stage 2 (Release 11)," Technical Report, Dec. 2011, 40 pp.

(Continued)

*Primary Examiner* — Vinncelas Louis
(74) *Attorney, Agent, or Firm* — Shumaker & Sieffert, P.A.

(57) ABSTRACT

In general, techniques are described for using virtual local area networks (VLANs) to facilitate packet forwarding between wireless endpoint devices attached to a wireless local area network (WLAN) access network and one or more mobile gateways providing access to packet data network services. For example, a wireless access gateway includes an upstream interface for a mobility tunnel to a mobile gateway of a mobile service provider network and a downstream interface for a WLAN access network. The wireless access gateway receives a packet from the mobile gateway by the upstream interface. The wireless access gateway determines, based at least on the mobility tunnel, a VLAN of the WLAN access network that is uniquely associated in the wireless access gateway with a combination of the APN associated with the mobility tunnel and the mobile gateway. The wireless access gateway then forwards, to a wireless endpoint device, the packet on the VLAN.

20 Claims, 5 Drawing Sheets

(51) Int. Cl.
  *H04L 29/12*    (2006.01)
  *H04L 12/46*    (2006.01)
  H04L 12/931    (2013.01)
  H04W 84/12    (2009.01)

(52) U.S. Cl.
  CPC ......... *H04W 76/022* (2013.01); *H04L 49/354* (2013.01); *H04W 84/12* (2013.01)

(56) References Cited

U.S. PATENT DOCUMENTS

| | | |
|---|---|---|
| 2008/0044181 A1 | 2/2008 | Sindhu |
| 2013/0003736 A1 | 1/2013 | Szyszko et al. |
| 2013/0007237 A1 | 1/2013 | Mehta et al. |
| 2013/0188625 A1* | 7/2013 | Setia .................. H04L 12/4641 370/338 |
| 2014/0086226 A1* | 3/2014 | Zhao et al. .................. 370/338 |

OTHER PUBLICATIONS

U.S. Appl. No. 13/248,834, filed Sep. 9, 2011 and entitled "Mobile Gateway Having Reduced Forwarding State for Anchoring Mobile Subscribers."

* cited by examiner

| APN | GATEWAY | VLAN-ID |
|---|---|---|
| 1 | ADDR 1 | 12 |
| 1 | ADDR 2 | 13 |
| 2 | ADDR 5 | 57 |
| 4 | ADDR 4 | 548 |

ACCESS POINT NAME MAPPINGS FOR A LAYER TWO WIRELESS ACCESS NETWORK

TECHNICAL FIELD

The disclosure relates to computer networks and, more specifically, to wireless access networks.

BACKGROUND

Use of wireless endpoint devices for accessing computer data networks has recently increased dramatically. These wireless endpoint devices, or more simply "wireless devices," provide a platform for both cellular phone calls and cellular-based access to computer data services. For example, a typical cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, also "mobile network" or "cellular network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber data traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange subscriber data with application or other servers of the PDNs. The increasing number of services available to an increasing number of mobile subscriber devices pressures available mobile network resources.

A mobile network gateway or simply "mobile gateway" is a service node of the mobile service provider network that operates as a gateway to the PDNs and functions as the anchor point for wireless device mobility. The mobile gateway applies policy and charging rules to subscriber data traffic between the PDNs and wireless devices to perform charging functionality and manage service connections to ensure an efficient utilization of core, transport, and radio network resources. Different services, such as Internet, E-mail, voice, and multimedia, have different quality of service (QoS) requirements that, moreover, may vary by subscriber.

The ubiquitous use of wireless devices and the ever-increasing desire by subscribers for fast network access has presented many challenges. For example, the ubiquitous use of cellular wireless devices have placed a high demand for data services over the service provider's mobile network, often straining the mobile network and resulting in delayed or lost data communications. Some wireless devices however, in addition to supporting connections to a PDN via a radio interface to the cellular mobile network, also (or in many cases alternatively) support wireless capabilities to exchange data by a wireless local area network access (WLAN) network that is separate from the cellular network of the mobile service provider. For example, many wireless devices include a WLAN interface that provides data service when in the presence of a Wi-Fi "hotspot" or other WLAN access point (AP), including Wi-Fi Access Points. Other examples of such wireless capabilities may include Bluetooth or Near Field Communication (NFC). When in the presence of a WLAN access network, a mobile subscriber may transition the data services of the wireless to the WLAN so as to accelerate data transmissions, reduce costs, and avoid any delays associated with the mobile service provider network. A wireless access gateway for the WLAN access network, such as a WLAN access gateway, may provide network access to the cellular mobile network by an interface with the mobile gateway.

SUMMARY

In general, techniques are described for using virtual local area networks (VLANs) to facilitate packet forwarding between wireless endpoint devices attached to a wireless local area network (WLAN) access network and one or more mobile gateways providing access to packet data network services. Moreover, the techniques facilitate packet forwarding even in network topologies where a service provider utilizes multiple, overlapping layer three (L3) address pools for different access point names (APN) used within the mobile service provider network.

An Access Point Name (APN) identifies a packet data network (PDN) and may resolve to a mobile gateway for a mobile service provider network that operates as a gateway to the PDN. A wireless access gateway for the WLAN access network allows wireless devices to attach to the mobile gateway to receive services identified by APNs, which may be provided by the wireless devices and/or subscription profiles loaded during authorization and authentication of the wireless devices.

As described, in some examples, the wireless access gateway assigns a VLAN identifier to a unique combination of an APN and a layer 3 (L3) address (e.g., IPv4 address) for a mobile gateway to which the APN resolves. For example, some service provider networks configure multiple mobile gateway devices, each having a different L3 address, to operate as redundant gateways to a particular APN and, in this way, load balance packet processing for a given APN among the multiple mobile gateway devices. For any particular combination of APN and mobile gateway L3 address, the wireless access gateway uses the corresponding VLAN for the assigned VLAN identifier to forward layer two (L2) packets in the WLAN access network that are both associated with the APN and received from the mobile gateway L3 address. Similarly, WLAN access network devices use the corresponding VLAN for the assigned VLAN identifier to forward L2 packets to the wireless access gateway to notify the wireless access gateway of the association of the L2 packets with an APN, mobile gateway L3 address combination. The wireless access gateway forwards L2 packets associated with the combination to the mobile gateway to which the APN resolves and that anchors the subscriber session for the wireless device that issued the L2 packets.

In some example implementations, mobile service provider networks may use different virtual private networks having overlapping L3 address spaces for different APNs for assignment to attached wireless devices. By using the assigned VLAN identifiers to distinguish L2 traffic having identical L3 characteristics (i.e., source/destination L3 addresses corresponding to wireless endpoint devices), the techniques may enable the full use of overlapping L3 address pools (e.g., IPv4 pools) for attached wireless endpoint devices within the mobile service provider network and, more specifically, within the WLAN access network. The techniques may further simplify management of L3 address pools for different APNs by relieving the mobile service provider network of ensuring the assignment of unique L3 addresses to wireless devices attached to the WLAN access network. Accordingly, the L3 address pools management and L3 address assignment may be accomplished via either a Dynamic Host Configuration Protocol (DHCP) server or by local configuration of the mobile gateways without regard to the authentication mechanism for the wireless devices. The described techniques may in addition reduce an amount of data plane processing by the wireless access gateway.

In one aspect, a method includes receiving, by an wireless access gateway having an upstream interface for a mobility tunnel to a mobile gateway of a mobile service provider network and having a downstream interface for a wireless local area network (WLAN) access network, a packet from the mobile gateway by the upstream interface for the mobility tunnel, wherein the mobility tunnel conforms to a mobility tunneling protocol and transports, between the wireless access gateway and the mobile gateway, subscriber data traffic associated with an Access Point Name (APN). The method also includes determining, by the wireless access gateway and based at least on the mobility tunnel, a virtual local area network (VLAN) of the WLAN access network that is uniquely associated, in the wireless access gateway, with a combination of the APN and the mobile gateway. The method further includes forwarding, by the wireless access gateway to a wireless endpoint device, the packet on the VLAN of the WLAN access network.

In another aspect, a wireless access gateway comprises a forwarding unit having a packet processor and at least one network interface. The wireless access gateway also comprises a downstream interface for a wireless local area network (WLAN) access network. The wireless access gateway further comprises an upstream interface for a mobility tunnel to a mobile gateway of a mobile service provider network and having, wherein the mobility tunnel conforms to a mobility tunneling protocol and transports, between the wireless access gateway and the mobile gateway, subscriber data traffic associated with an Access Point Name (APN), wherein the upstream interface is configured to receive a packet from the mobile gateway, wherein the packet processor is configured to determine, based at least on the mobility tunnel, a virtual local area network (VLAN) of the WLAN access network that is uniquely associated, in the wireless access gateway, with a combination of the APN and the mobile gateway, and wherein the packet processor is configured to forward, to a wireless endpoint device, the packet on the VLAN of the WLAN access network.

In another aspect, a non-transitory computer-readable medium comprises instructions. The instructions cause one or more programmable processors to receive, by an wireless access gateway having an upstream interface for a mobility tunnel to a mobile gateway of a mobile service provider network and having a downstream interface for a wireless local area network (WLAN) access network, a packet from the mobile gateway by the upstream interface for the mobility tunnel, wherein the mobility tunnel conforms to a mobility tunneling protocol and transports, between the wireless access gateway and the mobile gateway, subscriber data traffic associated with an Access Point Name (APN). The instructions also cause the processor(s) to determine, by the wireless access gateway and based at least on the mobility tunnel, a virtual local area network (VLAN) of the WLAN access network that is uniquely associated, in the wireless access gateway, with a combination of the APN and the mobile gateway. The instructions further cause the processor(s) to forward, by the wireless access gateway to a wireless endpoint device, the packet on the VLAN of the WLAN access network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 depicts a mapping table according to techniques of this disclosure.

Like reference characters denote like elements throughout the figures and text.

DETAILED DESCRIPTION

Figure 1:
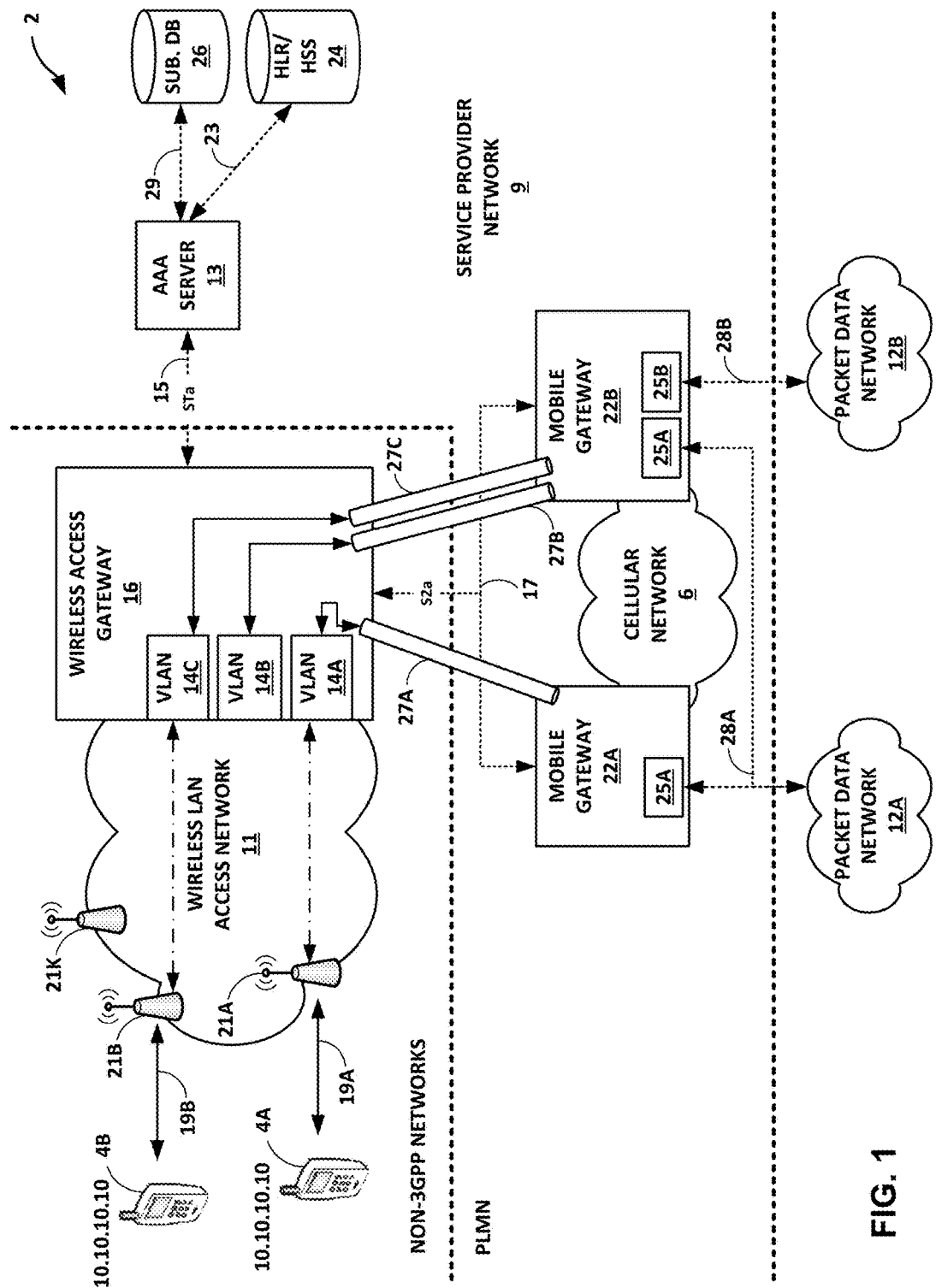
FIG. 1 is a block diagram illustrating an example network system in which a wireless access gateway receives and forwards packets using virtual local area networks of a wireless local area network access network in accordance with the described techniques.

FIG. 1 is a block diagram illustrating an example network system in which a wireless access gateway receives and forwards packets using virtual local area networks of a wireless local area network access network in accordance with the described techniques. In the example of FIG. 1, network system 2 includes network components that enable wireless endpoint devices 4A-4B to attach to a wireless local area network (WLAN) access network 11 that provides network access services to packet data networks (PDNs) 12A-12B (collectively, "PDNs 12") by mobile service provider network 9 (hereinafter, "SP network 9"). Network systems 2A-2B includes an example SP network 9 having a cellular network 6 that allows data communications between wireless device 4 and any of PDNs 12. SP network 9 is an example of a Public Land Mobile Network (PLMN) and may be a Home PLMN for a subscriber associated with wireless device 4.

Packet data networks 12 each supports one or more packet-based services that are available for request and use by wireless device 4. As examples, PDNs 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data networks 12 may each include, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates SP network 9, an enterprise IP network, or some combination thereof. In various embodiments, any of PDNs 12 is connected to a public WAN, the Internet, or to other networks. Packet data networks 12 execute one or more packet data protocols (PDPs), such as IP (IPv4 and/or IPv6), X.25 or Point-to-Point Protocol (PPP), to enable packet-based transport of PDNs 12 services.

Wireless endpoint devices 4A-4B (collectively, "wireless devices 4") each represents any mobile endpoint communication device that supports local wireless (e.g., "WiFi") network access, e.g., by way of a wireless LAN interface using any of the IEEE 802.11 communication protocols. Wireless devices 4 may optionally support cellular radio access for communication with a base station that represents a radio access network of SP network 9 and communicatively coupled to cellular network 6. Each of wireless devices 4 may represent, for example, a mobile telephone; a laptop, tablet, or other mobile computer including, e.g., a 3G/4G wireless card; a smart phone; or a personal data assistant (PDA) having WLAN communication and optional cellular communication capabilities. Wireless devices 4 may run one or more software applications, such as VoIP clients, video games, videoconferencing, E-mail, and Internet browsers, among others. Certain applications running on wireless devices 4 may require access to services offered by either or both of PDNs 12, such as mobile calls, video games, videoconferencing, and email, among others. Wireless devices 4 may also be referred to, in various architectural instances, as a User Equipment (UE) or a mobile station (MS). One example of a wireless device is described in U.S. patent application Ser. No. 12/967,977, filed Dec. 14, 2010, and entitled "MULTI-SERVICE VPN NETWORK CLIENT FOR WIRELESS DEVICE," incorporated herein by reference. Wireless devices 4 may each optionally store a unique identifier such as an International Mobile Subscriber Identity (IMSI) or an International Mobile Equipment Identity (IMEI) stored, for instance, in a subscriber identity module (SIM) or in a memory or integrated circuit of respective wireless devices 4. In the illustrated example, wireless devices 4 are assigned a same layer 3 (L3) PDP (e.g., IPv4/IPv6) address, 10.10.10.10, for communications with PDNs 12 as transported by mobile SP network 9 and WLAN access network 11. Wireless devices 4 may in some cases have different PDP addresses.

A service provider operates SP network 9 to provide network access, data transport and other services. SP network 9 includes cellular network 6 and, typically, one or more radio access networks. In some instances, SP network 9 includes either or both of PDNs 12 that, in such instances, offers service provider IP services such as IP Multimedia Subsystem (IMS), Packet Switch Streaming (PSS), and/or Multimedia Broadcast/Multicast Service (MBMS) User Service.

The service provider provisions and operates cellular network 6 to provide cellular-based network access, data transport and other services to cellular mobile devices, which may include wireless devices 4. In general, cellular network 6 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GPP/2), the Internet Engineering Task Force (IETF), and the Worldwide Interoperability for Microwave Access (WiMAX) forum. For example, cellular network 6 may represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum. As used herein, "cellular-based services" or "3GPP-based services" refer to services, including network access, provided by any of the above or similar architectures. By contrast, non-cellular-based services or "non-3GPP-based services" refer to services provided by other architectures, such as WLAN access network architectures represented by wireless LAN access network 11 (alternatively, "WLAN access network 11").

Cellular network 6 includes mobile gateways 22A-22B (collectively, "mobile gateways 22") that each operates as a gateway to PDNs 12 by Gi/SGi interfaces 28A-28B over one or more physical communication links. Each of mobile gateways 22 may represent a Gateway GPRS Support Node (GGSN), PDN Gateway (PGW), Packet Data Gateway (PDG), and/or other mobile access gateway to a packet data network. Mobile gateways 22 may provide packet routing and switching, as well as mobility management, authentication, and subscriber session management for any of wireless devices 4 using a corresponding "subscriber session." The packet-switched services provided by mobile gateways 22 may further include call handling services, signaling, billing, and internetworking between cellular network 6 and external networks, such as PDNs 12.

Each of Access Point Names (APNs) 25A-25B identifies one of PDNs 12 and may in some instances further identify a requested service (e.g., Internet, WAP, or multimedia messaging service (MMS)) provided by a packet data network 12. In other words, the APN is a logical name that resolves to the appropriate mobile gateway 22 for the wireless device 4 requesting services and, in some cases, identifies the services requested by the user or the address of an access point in one of PDNs 12 to which user packets from the wireless device should be forwarded. Specifically, APN 25A identifies PDN 12A, and APN 25B identifies PDN 12B. APNs 25 resolve to mobile gateways 22 (typically by use of a Domain Name Service), which operate as gateways to PDNs 12. In the example of FIG. 1, APN 25A resolves to mobile gateways 22A and 22B, which operates as gateways to PDN 12A by Gi/SGi interface 28A. Mobile gateways 22 may, as a result, load balance subscriber sessions for network system 2. In some examples, a load balancing device intermediates communications, including subscriber data traffic, between wireless access gateway 16 and mobile gateways 22 and/or between mobile gateways 22 and either or both of PDNs 12. APN 25B resolves to mobile gateway 22B, which operates as a gateway to PDN 12B by Gi/SGi interface 28B.

Wireless LAN access gateway 16 (illustrated and described hereinafter as "wireless access gateway 16") in cooperation with mobile gateways 22 establishes respective subscriber sessions for wireless devices 4 that determine operations performed by mobile gateways 22 and wireless access gateway 16 on subscriber packets associated with the subscriber sessions. In general, a subscriber session is an association between SP network 9 and one of wireless devices 4 (or any other wireless device) that is identifiable by a combination of a wireless device 4 PDP (e.g., IPv4/IPv6) address and an Access Point Name (APN) for a service provided by either of PDNs 12, although SP network 9 may use a default APN in cases where wireless device 4 or a subscriber profile for wireless device 4 does not specify an APN. A subscriber session (alternatively referred to herein as a "connectivity access network (CAN) session," "service session," or "session") is thus a service-specific (as specified by the APN) session for a service provided to the associated one of wireless device 4. In an IP-based SP network 9, a subscriber session is an IP-CAN session.

With respect to wireless device 4A, for example, wireless device 4A connects to WLAN access network 11 to receive data services. WLAN access network 11 may be considered by SP network 9 as a trusted non-3GPP access network and may represent, for example, a WLAN or Wi-Fi network using any of the IEEE standards that govern wireless networking transmission methods, such as IEEE 802.1a, 802.11b, 802.11g, and/or 802.11n. While described as a "wireless" LAN access network 11, WLAN access network 11 may further include wired (or "wireline") communication links and intermediate network devices that communicatively couple access points 21 and wireless access gateway 16. In the example of FIG. 1, WLAN access network 11 includes access points 21A-21K (collectively, "access points 21"), to which wireless device 4 can attach in order to access the services available through PDN 12. As illustrated, wireless device 4A attaches to WLAN access network 11 by access point 21A, and wireless device 4B attaches to WLAN access network 11 by access point 21B. In various examples, wireless devices 4 may attach to the same access point 21. WLAN access network 11 may include one or more wireless LAN controllers (WLCs) (not shown) that each aggregates one or more of access points 21 and may perform association and/or authentication of wireless devices 4 as well as switching packets between wireless clients and wired portions of WLAN access network 11.

WLAN access network 11 also includes wireless access gateway 16 that interfaces to mobile gateways 22 to provide wireless devices 4 with access to SP network 9. Wireless access gateway 16 may additionally authenticate wireless devices 4 using Authentication, Authorization, and Accounting (AAA) server 13 of SP network 9 to provide trusted access to SP network 9. In some examples, wireless access gateway 16 may represent a SaMOG-based gateway. SaMOG techniques are described further in "Study on S2a Mobility based On GTP & WLAN access to EPC (SaMOG)," 3rd Generation Partnership Project, Technical Specification Group Services and System Aspects, Stage 2 (Release 11), which is incorporated by reference in its entirety herein. In some cases, the service provider of SP network 9 operates and manages the wireless access gateway 16. In such cases, the wireless access gateway 16 may be considered a component of SP network 9. In some cases, wireless access gateway 16 is part of an enterprise network that, e.g., contracts with SP network 9 to receive network services.

Wireless access gateway 16 interfaces to mobile gateway 22 and AAA server 13 by S2a interface 17 and STa interface 15, respectively. STa interface 15 (also referred to as an STa reference point) connects WLAN access network 11 with AAA server 15 and transports access authentication, authorization, and optionally mobility parameters and charging-related information. S2a interface 17 and STa interface 15 may operate over a backhaul IP network connecting wireless access gateway 16 and mobile gateway 22. S2a interface 17 (also referred to as an S2a reference point) is an interface for a mobility tunneling protocol such as GPRS Tunneling Protocol (GTP) or Proxy Mobile IP (PMIP) interface and is thus similar to a Gn interface of a UMTS network or to an S5/S8 interface of an LTE network. S2a interface 17 is described hereinafter as GTP-based. In some cases, S2a interface 17 represents an S2b and/or SWn reference point/interface, or other identified interface for another mobility tunneling protocol. Wireless access gateway 16 may thus incorporate and perform both the Trusted WLAN AAA Proxy (TWAP) and Trusted WLAN Access Gateway (TWAG) functions for alternate access network 11.

Reference herein to "subscriber data traffic" or simply "data traffic" refers to one or more data packets associated with any of wireless devices 4 and a corresponding subscriber to SP network 9. A subscriber to SP network 9 may include any individual or entity receiving services from SP network 9 and not merely those having a pre-existing contractual relationship with the service provider.

In some examples, mobile gateways 22 may assign PDP addresses to wireless devices 4 that are allocated from overlapping PDP address spaces (hereinafter, "address spaces"). The address spaces may in some cases included private PDP addresses on SP network 9 for which mobile gateways 22 perform Network Address Translation (NAT) on Gi/SGi interfaces 28. Mobile gateways 22 may in some cases use respective virtual private networks (VPNs) for APNs 25A, 25B to exchange routes using Virtual Routing and Forwarding (VRF) instances and, in such cases, may allocate PDP addresses to wireless devices 4A, 4B from PDP address spaces that overlap in the different VPNs. Put another way, different VPNs associated with respective APNs 25/PDNs 12 may use at least partially overlapping L3 address space, and mobile gateways 22 may allocate PDP addresses to wireless devices 4 from the overlap.

Network system 2 of FIG. 1 implements a load-balancing scenario in which mobile gateways 22 may load balance subscriber sessions associated with APN 25A and PDN 12A. Mobile gateway 22B may additionally implement subscriber sessions associated with APN 25B for PDN 12B. Accordingly, mobile gateway 22B allocates, from the L3 address space of a first VPN, PDP address 10.10.10.10 to wireless device 4B requesting APN 25B. Either of mobile gateways 22 may allocate the same PDP address 10.10.10.10 to wireless device 4A requesting services of APN 25B/PDN 12B from the portion of the L3 address space of a second VPN that overlaps with the L3 address space of the first VPN.

Mobile gateways 22 establish mobility tunnels 27A-27C (collectively, "mobility tunnels 27") to exchange subscriber data traffic over the S2a interface 17 with wireless access gateway 16. Each of mobility tunnels 27 is associated with one of mobile gateways 22 and one of APNs 25. Network system 2 includes mobility tunnel 27A that is associated with APN 25A to transport subscriber data traffic between wireless access gateway 16 and PDN 12A, via mobile gateway 22A. Network system 2 also includes mobility tunnel 27B that is associated with APN 25A to transport subscriber data traffic between wireless access gateway 16 and PDN 12B, via mobile gateway 22B. Network system 2 also includes mobility tunnel 27C that is associated with APN 25B to transport subscriber data traffic between wireless access gateway 16 and PDN 12B, via mobile gateway 22B. Wireless access gateway 16 and mobile gateways 22 implement mobility tunnels 27 using a mobility tunneling protocol operating over S2a interface 17, such as GTP. In other words, mobility tunnels 27 may each represent GTP-U(ser data) tunnels. Although depicted as bi-directional tunnels, each of mobility tunnels 27 may represent separate upstream and downstream mobility tunnels for upstream and downstream traffic.

In accordance with techniques described in this disclosure, network devices of WLAN access network 11, including wireless access gateway 16, disambiguate subscriber data traffic associated with respective wireless devices 4A-4B using virtual local area networks (VLANs) 14A-14C (collectively, "VLANs 14") of WLAN access network 11. VLANs 14 are a generic grouping mechanism for layer 2 (L2) packets, such as Ethernet frames, that allow logical isolation of multiple L2 networks that share the same physical L2 interfaces. VLANs 14 allow network devices of WLAN access network 11 to multiplex the L2 subscriber data traffic for wireless devices 4 over shared physical L2 interfaces. In this way, each of VLANs 14 provides a connection between devices assigned to the VLAN 14, and each of the VLANs 14 may be considered an independent layer two (L2) network. Layer 2 frames for different VLANs 14 may be correctly forwarded within WLAN access network 11 by appending a VLAN tag to the L2 packets to designate the VLAN 14 to which each L2 packet belongs. Network devices of WLAN access network 11 learn L2 addresses (e.g., MAC addresses) on a VLAN 14-specific basis. VLANs 14 may operate according to IEEE 802.1q, in which case a corresponding VLAN identifier may consist of a 12-bit VLAN tag value. VLANs 14 are illustrated as interfaces of wireless access gateway 16 for ease of illustration purposes.

In some examples, as is shown in the example of FIG. 1, the wireless access gateway 16 assigns each individual VLAN 14 to a combination of APN and layer 3 (L3) address (e.g., IPv4 addresses) for one of mobile gateways 22 to the APNs. Wireless access gateway 16 then uses the corresponding VLAN 14 to forward layer 2 (L2) packets associated with the APN 25 and the mobile gateway 22 in the WLAN access network 11. Similarly, WLAN access network 11 devices use the corresponding VLAN 14 to forward L2 packets associated with the APN 25 and the mobile gateway 22 to the wireless access gateway 16. The wireless access gateway 16 may then forward VLAN tagged L2 packets associated with the APN 25 to the appropriate mobile gateway 22 to which the APN 25 resolves and that anchors the subscriber session associated with the L2 packets.

In the illustrated example, wireless access gateway 16 assigns VLAN 14A to a combination of APN 25A and an L3 address of mobile gateway 22A. By association with APN 25A and the L3 address of mobile gateway 22A, mobility tunnel 27A is therefore also associated with VLAN 14A in wireless access gateway 16. Wireless access gateway 16 also assigns VLAN 14B to a combination of APN 25A and an L3 address of mobile gateway 22B. By association with APN 25A and the L3 address of mobile gateway 22B, mobility tunnel 27B is therefore also associated with VLAN 14B in wireless access gateway 16. Wireless access gateway 16 also assigns VLAN 14C to a combination of APN 25B and an L3 address of mobile gateway 22B. By association with APN 25B and the L3 address of mobile gateway 22B, mobility tunnel 27C is therefore also associated with VLAN 14C in wireless access gateway 16.

Wireless access gateway 16 forwards upstream (i.e., toward one of PDNs 12) subscriber data traffic received on one of VLANs 14 of WLAN access network 11 by mapping the VLAN-tag of the subscriber data traffic to the mobility tunnel 27 that is associated with the VLAN 14 for the VLAN-tag. Thus, wireless access gateway 16 forwards upstream subscriber data traffic received on VLAN 14A to mobile gateway 22A using mobility tunnel 27A and forwards upstream subscriber data traffic received on VLAN 14C to mobile gateway 22B using mobility tunnel 27C. Wireless access gateway 16 forwards downstream (i.e., toward wireless devices 4) subscriber data traffic by determining the VLAN 14 that is associated with the mobility tunnel from which wireless access gateway 16 the subscriber data traffic. For instance, wireless access gateway 16 maps mobility tunnel 27A to VLAN 14A to tag downstream subscriber data traffic received from mobility tunnel 27A with the VLAN identifier for VLAN 14A and forward the downstream subscriber data traffic on WLAN access network 11 as VLAN-encapsulated L2 packets. The use of VLANs 14 in this manner may enable wireless access gateway 16 and other network devices of WLAN access network 11 to disambiguate subscriber traffic that is sourced by/destined to a same PDP address but issued by/sent to different wireless devices 4. The 1:1 mapping and use of a combination of APN and mobile gateway 22 L3 address to a VLAN 14 identifier may also facilitate processing of the subscriber traffic by the one of mobile gateways 22 that anchors the subscriber session associated with the subscriber traffic. Still further, by associating VLAN 14 identifiers with a combination of APN and mobile gateway 22 L3 address rather than with a particular mobility tunnel 27, the techniques may allow the wireless access gateway 16 to use the same VLAN 14 identifier for multiple mobility tunnels for the APN, mobile gateway 22 L3 address combination (e.g., a mobility tunnel for a default bearer and one or more mobility tunnels for corresponding dedicated bearers providing different QoS guarantees).

Figure 2:
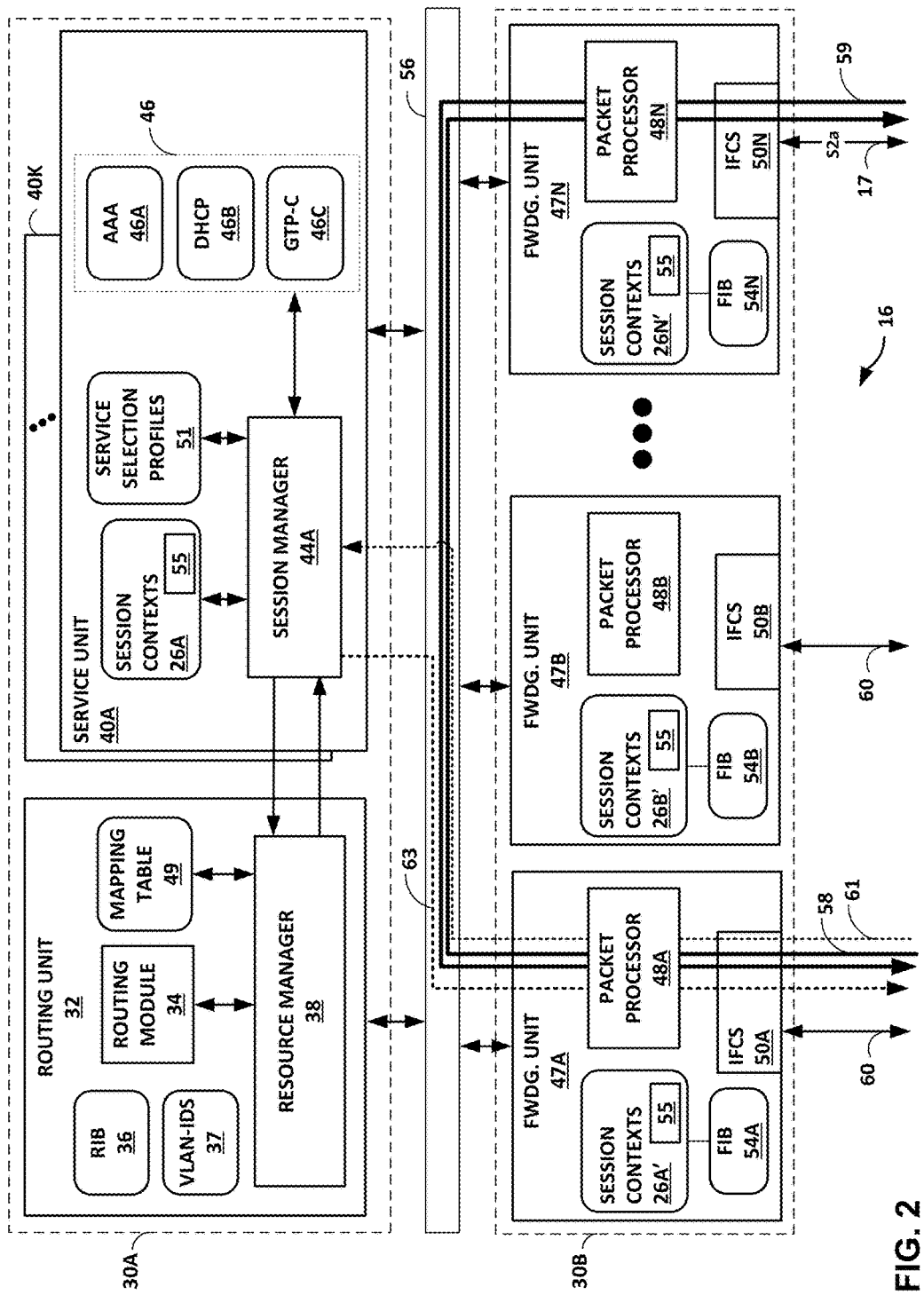
FIG. 2 is a block diagram illustrating, in further detail, an example wireless access gateway that assigns virtual local area network identifiers for subscriber data traffic according to techniques described in this disclosure.

FIG. 2 is a block diagram illustrating, in further detail, an example wireless access gateway that assigns virtual local area network identifiers for subscriber data traffic according to techniques described in this disclosure. In this example, wireless access gateway 16 is divided into two logical or physical "planes" to include a first control plane 30A and a second "data" or "forwarding" plane 30B. That is, wireless access gateway 16 implements two separate functionalities, e.g., the routing/control and forwarding/data functionalities using physically separated hardware components that either statically implement the functionality in hardware or dynamically execute software to implement the functionality.

Control plane 30A is a decentralized control plane in that control plane functionality is distributed among routing unit 32 and a plurality of subscriber management service units 40A-40K (illustrated as "service units 40"). Similarly, data plane 30B in this example is a distributed data plane in that packet processing and forwarding functionality is distributed among a plurality of forwarding units 47A-47N (illustrated as "fwdg. units 47A-47N" and collectively referred to as "forwarding units 47"). Each of routing unit 32, subscriber management service units 40, and forwarding units 47 may include one or more processors (not all processors shown in FIG. 2) that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 32, subscriber management service units 40, and forwarding units 47 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 56 couples routing unit 32, subscriber management service units 40, and forwarding units 47 to deliver data units and control messages among the units. Switch 56 may represent an internal switch fabric or cross-bar, bus, or link. Examples of high-speed multi-stage switch fabrics used as a data plane to relay packets between units within a router are described in U.S. Patent Application 2008/0044181, entitled "MULTI-CHASSIS ROUTER WITH MULTIPLEXED OPTICAL INTERCONNECTS." The entire contents of U.S. Patent Application 2008/0044181 are incorporated herein by reference. Switch 56 may implement an Ethernet or other type of L2 network.

Data plane 30B represents hardware or a combination of hardware and software that forward network traffic in accordance with forwarding information stored by forwarding information bases (FIBs) 54A-54N (collectively, "FIBs 54"). In the example wireless access gateway 16 of FIG. 2, data plane 30B includes forwarding units 47 that provide high-speed forwarding of subscriber data traffic received by interface cards 50A-50N ("IFCs 50") by WLAN access network interfaces 60 AND S2a reference point 17. More particularly, interface cards 50A, 50B interface with WLAN access network interfaces 60, and forwarding units 47A, 47B therefore implement interfaces for L2 forwarding between wireless access gateway 16 and downstream access points and/or WLCs. Interface cards 50N interface with reference point S2a connecting wireless access gateway 16 to one or more mobile gateways, and forwarding unit 47N therefore implements protocol interfaces for user plane tunneling and tunnel management between wireless access gateway 16 and mobile gateways (e.g., mobile gateways 22 of FIG. 1). Each of interface cards 50 includes one or more outbound interfaces that couple to physical communication links to external devices that are capable of carrying subscriber control and data traffic.

Forwarding units 47 receive and forward control and data packets via switch 56 along internal forwarding paths to anchoring units for the control and data packets. Forwarding units 47 may each include one or more packet forwarding engines ("PFEs") coupled to one or more interface cards 50 and may each represent, for example, a dense port concentrator (DPC), modular port concentrator (MPC), flexible physical interface card (PIC) concentrator (FPC), or another line card, for example, that is insertable within a wireless access gateway 16 chassis or combination of chassis. In some cases, reference to a "forwarding unit" refers to a single packet processor (e.g., a PFE) of a line card and in such cases a single line card may have one or more forwarding units. Interface cards 50A, for instance, may include multiple PICs that each includes one or more inbound/outbound interfaces.

Each of forwarding units 47 may include substantially similar components to perform substantially similar functionality, said components and functionality being described hereinafter primarily with respect to forwarding unit 47A. Internally, each of forwarding units 47 may include a unique identifier that identifies the forwarding unit to other components of wireless access gateway 16. Forwarding units 47 identifiers may include an index, slot, identifying string, internal IP address, interface identifier such as an outbound interface identifier, or link layer address, for instance. In some embodiments, inbound and outbound interfaces (e.g., ports) of interface cards 50 may be specified by identifying the port type, a slot in a wireless access gateway 16 chassis for the corresponding one of forwarding units 47, a PIC, and a port number. For example, GigE-3/1/2 identifies port 2 of PIC 1 on the one forwarding units 47 that occupies slot 3 in the wireless access gateway 16 chassis, and the port is a Gigabit Ethernet port.

Forwarding unit 47A includes a packet processor 48A that receives control and data session traffic via IFC card 50A and, if necessary, internally forwards the traffic to the anchoring one of subscriber management service units 40 (control traffic) or to the anchoring one of forwarding units 47 (data traffic) according to internal routes installed to forwarding information base 54A. Further details regarding internal packet forwarding are found in U.S. patent application Ser. No. 13/248,834, filed Sep. 9, 2011 and entitled "MOBILE GATEWAY HAVING REDUCED FORWARDING STATE FOR ANCHORING MOBILE SUBSCRIBERS," the entire contents being incorporated by reference herein.

Routing unit 32 of control plane 30A executes the routing functionality of wireless access gateway 16. In this respect, routing unit 32 represents hardware or a combination of hardware and software of control that implements with routing module 34 routing protocols by which routing information, stored in a routing information base 36 ("RIB 36"), may be exchanged with other routers. RIB 36 may include information defining a topology of a network, such as aspects of network system 2 of FIG. 1, e.g., the network between wireless access gateway 16 and mobile gateways 22. Routing module 34 may resolve the topology defined by routing information in RIB 36 to select or determine one or more routes through the network. For each of the selected routes, routing module 34 adds an entry to a route table that may specify, for the selected route, one or more outbound interfaces of various IFCs 50. The route table may be implemented as a radix tree having nodes that each key to a network address prefix, such as an IPv4/IPv6 network address prefix, and specify an outbound interface for the network address prefix. Routing module 34 may then update data plane 30B with this forwarding information directly or via resource manager 38, where forwarding units 47 of data plane 30B store the forwarding information in respective forwarding information bases 54A-54N ("FIBs 54"). Further details of one example embodiment of a router can be found in U.S. patent application Ser. No. 12/182,619, filed Jul. 30, 2008 and entitled "STREAMLINED PACKET FORWARDING USING DYNAMIC FILTERS FOR ROUTING AND SECURITY IN A SHARED FORWARDING PLANE," which is incorporated herein by reference.

Resource manager 38 of routing unit 32 allocates and manages resources of wireless access gateway 16 among service units 40 and forwarding units 47. In addition, resource manager 38 mediates communication among service units 40 and other components of routing 32, in particular, between session managers 44 and routing module 34 of routing unit 32.

Subscriber management service units 40 of control plane 30A may present a uniform L3 interface to downstream devices and provide decentralized subscriber session setup and management for wireless access gateway 16. The uniform L3 interface may include a single default gateway L3 (e.g., IPv4 or IPv6) address for wireless access gateway 16 for a WLAN access network. Thus, for example, all of subscriber management service units 40 may be addressable by the same IP address, and control messages destined for the same IP of subscriber management service units 40 may therefore be handled by any of the service units. Internally, each of subscriber management service units 40 may include a unique identifier that identifies the service unit to other components of wireless access gateway 16. Subscriber management service units 40 identifiers may include, for example, an index, slot, identifying string, internal IP address, or link layer address. Subscriber management service units 40 may each represent, for example, a packet forwarding engine (PFE) or other component of a physical interface card insertable within one or more chassis of wireless access gateway 16. The physical interface card may be, for instance, a multi-services dense port concentrator (MS-DPC). One or more of subscriber management service units 40 may also each represent a co-processor executing on a routing node, such as routing unit 32. Subscriber management service units 40 may be alternatively referred to as "service PICs" or "service cards." Each of subscriber management service units 40 includes substantially similar components to perform substantially similar functionality, said components and functionality being described hereinafter with respect to subscriber management service unit 40A (hereinafter, "service unit 40A"). Additional details regarding handling subscriber sessions with a decentralized control plane of multiple subscriber management service units may be found in U.S. patent application Ser. No. 13/172,556, entitled "MOBILE GATEWAY HAVING DECENTRALIZED CONTROL PLANE FOR ANCHORING SUBSCRIBER SESSIONS," filed Jun. 29, 2011, the entire contents being incorporated herein. In some examples, wireless access gateway 16 includes a less decentralized architecture and may include one or zero service units 40. In some cases, functionality attributed to service unit 40A may be performed by routing unit 32 or by a control unit that does not execute routing protocols.

Session manager 44A of service unit 40A establishes sessions, requested by a subscriber via a WLAN access network for which wireless access gateway 16 operates as a network gateway, and manages the sessions once established. Each of subscriber management service units 40 includes an instance of session manager 44 and may therefore independently execute control plane protocols 46 required to establish a requested session for a subscriber. In this sense, the subscriber management service units 40 provide a form of a decentralized control plane for managing subscriber communication sessions. As a result, the wireless access gateway 16 may achieve increased scalability to handle thousands or millions of concurrent communication sessions from wireless devices accessing the WLAN access network.

Session manager 44 receives requests to create or update subscriber sessions and responsively creates or updates the sessions by executing control protocols 46 to receive session context information. Subscriber session contexts 26A-26K (collectively, "session contexts 26") stored by respective service units 40A-40K include, for one or more subscriber sessions anchored by the respective forwarding unit, session context information (or "session data") that specifies data plane operations for subscriber traffic associated with the subscriber session. Session contexts 26A of service unit 40A stores, for example, context data for one or more subscriber sessions anchored in the control plane by service unit 40A and in the data plane by any of forwarding units 47. Each of forwarding units 47 includes a set of one or more session contexts 26A'-26N' for subscriber sessions anchored in the data plane of the forwarding unit 47. A forwarding unit 47 "anchors" a subscriber session in the decentralized data plane of wireless access gateway 16 by processing subscriber traffic associated with the subscriber session using the context data of one of corresponding session contexts 26A'-26N' for the subscriber session to perform the specified data plane operations. For example, forwarding unit 47A may receive, from WLAN access network 11, a packet associated with a subscriber session anchored by forwarding unit 47B. Forwarding unit 47A therefore internally forwards the packet to forwarding unit 4B for processing using context data of a session context of session contexts 26B'.

In the illustrated example, IFC 50A of forwarding unit 10 receives, from the WLAN access network, attach request 61, which packet processor 48A directs to service unit 40A via switch 56 in accordance with internal forwarding information in FIB 54A. Attach request 61 may represent a Remote Authentication Dial-In User Service (RADIUS) Access-Request and may conform to AAA protocol 46A. Attach request 61 indicates to wireless access gateway 16 that a wireless device associated with the attach request 61 is requesting attachment to receive L3 services from wireless access gateway 16 and, by extension, from a mobile service provider network in some cases. Wireless access gateway 16 may therefore establish a subscriber session in response to the attach request 61, in the manner described below.

Attach request 61 includes various parameters that wireless access gateway 16 uses to select a service profile of service selection profiles 51 for the associated subscriber. The parameters may include a basic service set identification (BSSID), service set identifier (SSID), domain-name, realm, username, and so forth. Each of service selection profiles 51 identifies an access point name (APN) that resolves to a mobile gateway that relays services provided by a packet data network. In some cases, session manager 44A receives an APN for attach request 61 from a AAA server by executing AAA 46A. In some cases, session manager 44A uses a default APN for a subscriber session established in response to attach request 61.

Session manager 44A resolves the APN for attach request 61 (typically using a Doman Name Service) to the L3 address for a mobile gateway (e.g., one of mobile gateway 22 of FIG. 1). In accordance with techniques described herein, routing unit 32 includes a pool of VLAN identifiers 37 (illustrated as "VLAN-IDs 37") for corresponding VLANs of a WLAN access network for which wireless access gateway 16 operates as a gateway. Routing unit 32 also includes a mapping table 49 having one or more mapping table entries that each maps a key consisting of an APN, L3 address combination to one of VLAN identifiers 37.

Session manager 44A requests, from routing unit 32, a VLAN identifier for the APN and L3 address of the resolved mobile gateway for the APN. Routing unit 32 queries mapping table 49 to determine whether a mapping table entry exists for the APN, L3 address combination. If so, mapping table 49 returns the mapped VLAN identifier 37 to session manager 44A. If not, resource manager 38 dynamically allocates an unused one of VLAN identifiers 37, maps the allocated VLAN identifier 3y7 to the APN, L3 address combination, and returns the mapped VLAN identifier 37 to session manager 44A.

To create and anchor the requested session in session contexts 26A, session manager 44A may request or allocate an IP address from a DHCP server for the requested session by executing DHCP 46B. Session manager 44A may, e.g., implement a DHCP relay agent or DHCP a server in order to receive and/or serve a L3 PDP address to the requesting wireless device. Session manager 44A may receive the L3 PDP address for requesting wireless device in a Create Session Response or Create PDP Context Response.

Session manager 44A may also negotiate with mobile service provider network devices such as mobile gateway 22 of FIG. 1, using GTP-C 46C messages, to create or modify a set of one or more bearers that carry service traffic for the requested session in GTP-U tunnels on a GTP-based or other mobility protocol-based interface between wireless access gateway 16 and a mobile service provider network. In this way, session manager 44A establishes session contexts 26A with session context information for the subscriber session associated with attach request 61. These control protocols are described merely as examples, and session manager 44A may execute other protocols related to charging, for example, to receive additional session context information for the session, or other protocols for mobility management, attachment, L3 address allocation and assignment, and so forth.

The new session context stored in session contexts 26A for the subscriber session associated with attach request 61 stores at least session context information either generated by or received by wireless access gateway 16 by executing control protocols 46. The session context information defines the operations to be performed on subscriber data traffic associated with the corresponding subscriber session. Such session context information may include, for example, the PDP (e.g., IP) address allocated by a DHCP server or another entity for the wireless device for use in sending and receiving subscriber packets, forwarding information used by forwarding units 47 in forwarding subscriber packets such as tunnel endpoint identifiers (TEIDs) and identifiers/addresses for downstream service nodes, the Access Point Name (APN) for the session, the mobile gateway L3 address, charging information, and one or more quality of service (QoS) profiles for the associated subscriber. Thus, the session context information for the subscriber session established for attach request 61 identifies the mobility tunnel to the mobile gateway (e.g., one of mobility tunnels 27 of FIG. 1) that transports subscriber data traffic associated with the subscriber session between wireless access gateway 16 and the mobile gateway.

According to techniques of this disclosure, session manager 44A assigns the VLAN identifier 37 allocated by resource manager 38 for the APN, mobile gateway L3 address combination to the new session context for the subscriber session associated with attach request 61. This VLAN identifier is illustrated in session contexts 26A as VLAN identifier 55, and each of the session contexts of session contexts 26A may include a similar VLAN identifier. In some cases, session manager 44A assigns the VLAN identifier allocated by resource manager 38 in the place of a suggested VLAN identifier for the subscriber session returned to wireless access gateway 16 in a AAA (e.g., RADIUS) message from a AAA server.

As control plane anchors for subscriber sessions, subscriber management service units 40 handle configuration of forwarding units 47 for constructing session-specific forwarding paths for processing and forwarding subscriber data traffic associated with the subscriber sessions. Session contexts 26A'-26N' (collectively, "session contexts 26'") of forwarding units 47 may each represent a subset of a chain of forwarding next hops that determine the operations applied to associated subscriber data traffic according to corresponding session contexts 26. Different session contexts of session contexts 26A may be spread across multiple session contexts 26' and thus multiple forwarding units 47. Example details on subscriber management service units 40 constructing subscriber-specific forwarding paths within forwarding units 47 can be found in Example details on internal forwarding paths of forwarding units 47 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Any one of forwarding units 47 may operate as an anchoring forwarding unit for a particular one of session contexts 26 to perform forwarding functionality on subscriber packets associated with the corresponding subscriber session. In other words, processing subscriber data traffic for each of session contexts 26 may be handled by any of forwarding units 47 (i.e., the anchor forwarding unit 47 for the session and corresponding session context 26). The respective anchor forwarding units for upstream and downstream subscriber data traffic for a subscriber session may be the same forwarding unit or different forwarding units, where "downstream" refers to toward end-user devices such as wireless devices 4 of FIG. 1 and "upstream" refers to toward a mobility anchor point such as mobile gateways 22 of FIG. 1.

Packet processors 48A-48N ("packet processors 48") of respective forwarding units 47 apply respective session contexts 26 to packets associated with subscriber sessions anchored in the data plane by the forwarding unit 47 that includes the packet processor. Each of packet processors 48 may represent computational components of a packet forwarding engine or network processor, for instance, and includes one or more general- or special-purpose processors, ASICs, ASSPs, FPGAs, or other programmable logic for forwarding packets in accordance with a corresponding one of FIBs 54 and processing packets in accordance with a corresponding one of session contexts 26. Packet processing operations applied by network processors 48 may include subscriber charging, firewall, protocol demultiplexing, tunnel encapsulation/decapsulation, internal forwarding, quality of service (QoS) policing, and route lookup operations. Packet processors 48 may alternatively be referred to as packet forwarding engines (PFEs).

Session manager 44A selects as, as a data plane anchor for a newly created or modified subscriber session, forwarding unit 47N and sends allocated VLAN identifier 55 to the forwarding unit 47N for storage to one of session contexts 26N' for the subscriber session associated with attach request 61. Session manager 44A may also send the VLAN identifier 55 to the remaining forwarding units 47 to define internal forwarding from ingress forwarding units 47 to anchor forwarding unit 47N for the new subscriber session for attach request 61.

Session manager 44A additionally issues, to the WLAN access network, access accept 63 including the VLAN identifier for the new subscriber session established in response to attach request 61. Access accept message 63 may represent a RADIUS Access-Accept message. Consequently, network devices of WLAN access network use the VLAN associated with the VLAN identifier to forward L2 packets associated with the subscriber session to wireless access gateway 16.

Subsequently, forwarding unit 47A receives, from a WLAN access network, upstream subscriber data traffic 58 that includes L3 traffic associated with the subscriber session established for attach request 61 and also includes a VLAN tag having a VLAN identifier that is VLAN identifier 55. Forwarding unit 47A determines the anchor forwarding unit 47N using the VLAN identifier 55 and then internally forwards upstream subscriber data traffic 58 by switch 56 to forwarding unit 47N. Packet processor 48N maps the VLAN tag of upstream subscriber data traffic 58, optionally in combination with the source L3 address of the L3 traffic therein, to the session context 26N' for the appropriate session context 26N', and applies forwarding constructs to forward the subscriber packets according to the session context data. Anchor processing of the packets by packet processor 48N may include encapsulating the subscriber packets using GTP or PMIP, for instance, which may include setting the specified upstream TEID for the session within a GTP-U header, and additionally encapsulating the GTP packet in an IP header directing the packet toward the mobile gateway that participates in implementing the EPS or other 3GPP bearer for the subscriber session. Packet processor 48N may apply FIB 54N to outer IP header to lookup the route and output the traffic on an outbound interface of IFCs 50N that implements reference point S2a.

Forwarding unit 47N may additionally receive, by a mobility tunnel, downstream subscriber data traffic 59 that includes L3 traffic associated with the subscriber session established for attach request 61. Packet processor 48N maps the mobility tunnel information (e.g., TEID and mobility gateway L3 address), optionally in combination with a L3 PDP address for the subscriber data traffic, to the appropriate session context 26N', which includes VLAN identifier 55. Packet process 48N encapsulates the received L3 packets of downstream subscriber data traffic 59 with an L2 header that includes a VLAN tag specifying VLAN identifier 55, then internally forwards the encapsulated downstream subscriber data traffic 59 to forwarding unit 47A for output by IFCs 50A.

By applying the described techniques in this way, wireless access gateway 16 may disambiguate between subscriber data traffic sourced by/destined to identical L3 addresses in situations in which the mobile service provider network allocates L3 addresses to wireless devices from overlapping L3 address spaces for different APNs. Moreover, associating VLAN identifiers 37 with a combination of APN and L3 address for a mobile gateway resolved for the APN allows the wireless access gateway 16 to direct subscriber data traffic to the appropriate mobile gateway in a mobile gateway load balancing scenario.

FIG. 3 depicts a mapping table according to techniques of this disclosure. Mapping table 49 of FIG. 2 is illustrated in further details and includes mapping table entries 70A-70D (collectively, "mapping table entries 70") that each maps a unique key for mapping table 49 to a VLAN identifier (the "VLAN-ID" column). The unique key consists of a combination of an APN (the "APN" column) and an IP address for a mobile gateway to which the APN resolves. For example, APN "2" and mobile gateway IP address "ADDR 5" map to VLAN identifier "57" as defined by mapping table entry 70C. Mapping table entries 70A, 70B both specify the same APN "1", but differentiate the unique key by reference to the IP address of one of at least two mobile gateways that resolves to the APN, which are identified by their respective IP addresses "ADDR 1" and "ADDR 2". The different VLAN identifiers for mapping table entries 70A, 70B therefore enable forwarding of subscriber data traffic, by wireless access gateway 16 to a WLAN access network, using the appropriate VLAN identifier according to the mobile gateway from which wireless access gateway 16 receives the subscriber data traffic.

Figure 4:
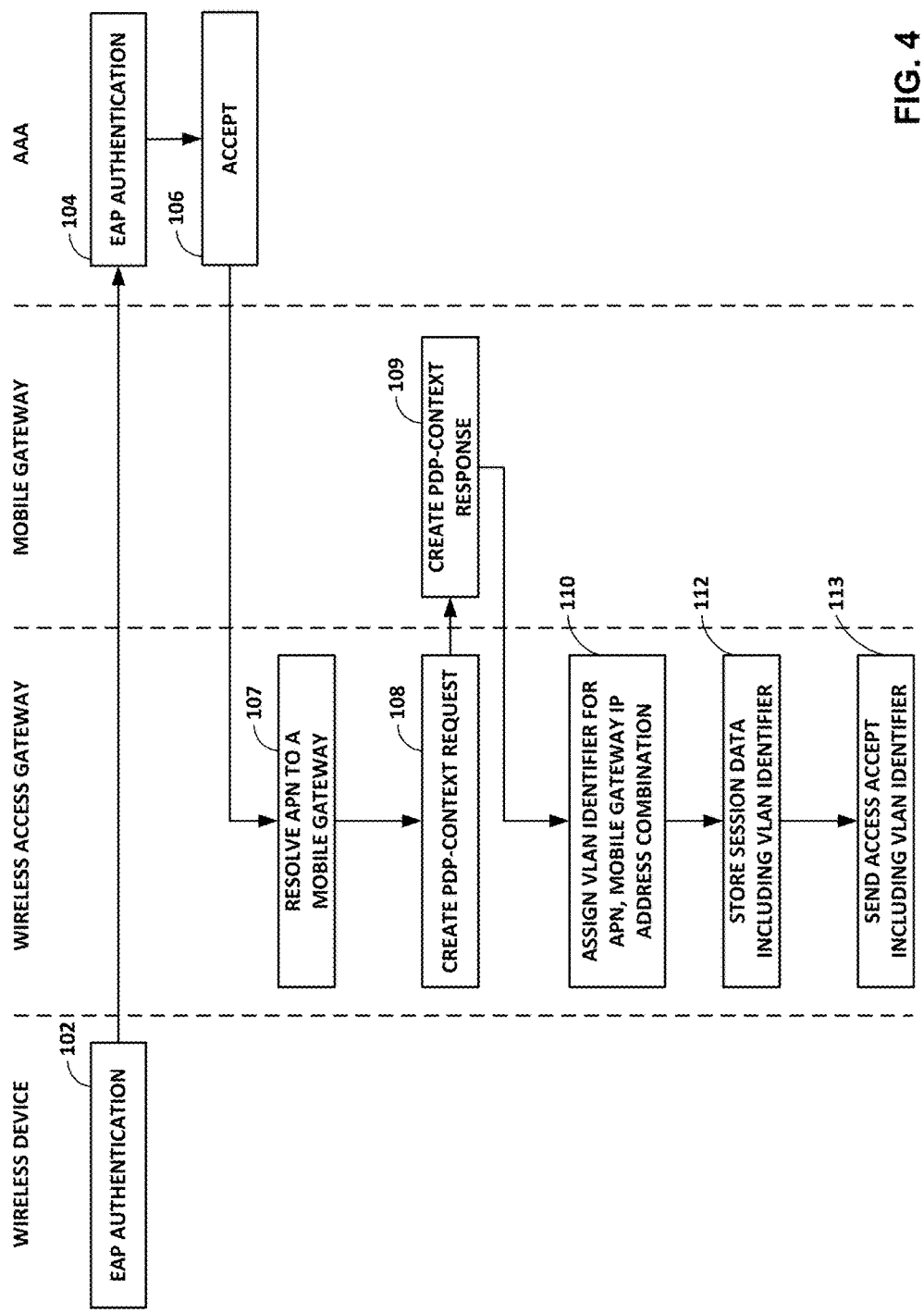
FIG. 4 is a flowchart illustrating an example mode of operation of a network system that includes a wireless access gateway, according to techniques described herein.

FIG. 4 is a flowchart illustrating an example mode of operation of a network system that includes a wireless access gateway, according to techniques described herein. The example of FIG. 4 illustrates operation of wireless device 4A, a wireless access gateway 16, AAA server 13, and mobile gateway 22A of FIG. 1. Wireless device 4A in conjunction with access point 32A perform authentication to AAA server 13 (102, 104). Wireless endpoint device 4A, access point 32A, and AAA server 13 may use a form of EAP, such as EAP-TTLS or PEAP, as part of WLAN 802.1x authentication. EAP authentication messages may include a RADIUS Access-Accept message from the wireless device to wireless access gateway 16.

Upon successful authentication of wireless device 4A, AAA server 13 optionally sends an Access-Accept message to wireless access gateway 16. The Access-Accept message may further include a ChargeableUserID (CUID) made up of the IMSI/MSISDN and (optionally) the APN as well as a derived Primary Master Key (PMK) as an encryption key (e.g., a Microsoft Point-to-Point Encryption (MPPE) key) (106). Wireless access gateway 16 continues establishment of the subscriber session for wireless device 4A by resolving an APN for the requested service to mobile gateway 22A that operates as a gateway for the PDN that provides the APN services (107). The resolution for the APN includes an IP address for mobile gateway 22A.

To establish, for wireless device 4A, a subscriber session including a GTP-U tunnel for a service (which may be identified in the Create PDP-Context Request message by the optional APN or a default APN), wireless access gateway 16 uses GTP-C signaling and sends a Create PDP-Context Request message to mobile gateway 22A (108), which responds with a Create PDP-Context Response message including an IP address for wireless device 4A (109). The IP address for wireless device 4A may be allocated by mobile gateway 22A from an IP address space that overlaps with another IP address space from which mobile gateways 22 allocated IP addresses to wireless devices attached to WLAN access network 11. In the context of an LTE architecture, GTP-C signaling may use Create Session Response/Request messages between wireless access gateway 16 and mobile gateway 22A.

Wireless access gateway 16 assigns a unique VLAN identifier for a VLAN of WLAN access network 11 to a combination of the APN for wireless device 4A and the IP address of mobile gateway 22A (110). Wireless access gateway 16 may store an association between the UE MAC address and the IP address returned in the Create PDP-Context Response message in one of session contexts 26N, together with the assigned VLAN identifier with which wireless access gateway 16 disambiguates subscriber data traffic for WLAN access network 11 among different wireless endpoint devices 4 (112). Wireless access gateway 16 may additionally forward an access accept that includes the VLAN identifier and the IP address assigned to wireless device 4A to the WLAN access network 11 (113), which completes the authentication with wireless device 4A. Wireless device 4A may obtain the IP address assigned to wireless device 4A by a Dynamic Host Configuration Protocol (DHCP) DHCP-Request to wireless access gateway 16. The access accept may represent a RADIUS Access-Accept, and a VLAN identifier may be included as an Attribute-Value-Pair (AVP), such as the Tunnel-Private-Group-ID AVP. A Tunnel-Private-Group-ID AVP may therefore include a 12-bit VLAN identifier and identify a subscriber data traffic as associated with a private group that includes wireless device 4A and any other wireless devices 4 having sessions with mobile gateway 22A for the APN.

Figure 5:
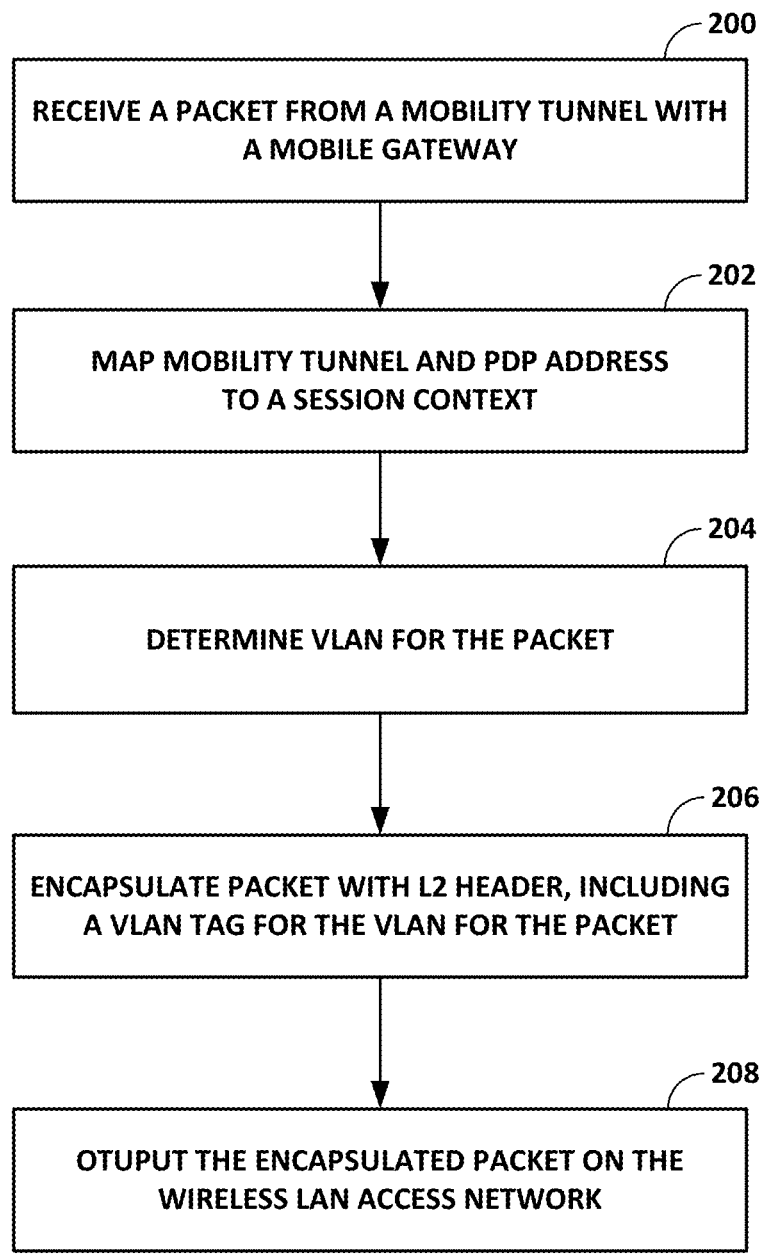
FIG. 5 is a flowchart illustrating an example mode of operation for a wireless access gateway connected to a wireless local area network access network and having an upstream mobility tunneling protocol interface to a mobile service provider network gateway, according to techniques described in this disclosure.

FIG. 5 is a flowchart illustrating an example mode of operation for a wireless access gateway connected to a WLAN access network and having an upstream mobility tunneling protocol interface to a mobile service provider network gateway, according to techniques described in this disclosure. The example mode of operation is described with respect to components of wireless access gateway 16 of FIG. 2.

Ingress forwarding unit 47N of wireless access gateway 16 receives a downstream packet from a mobility tunnel over S2a interface 17 (200). Packet processor 47N determines the session context in session contexts 26N' with which to process the packet by mapping the mobility tunnel and a destination PDP address for the packet to the session context (202). Ingress forwarding unit 47N may use a TEID for the mobility tunnel as a mapping key. The session context specifies a VLAN of WLAN access network 11 for the packet, which packet processor 47N determines after determining the session context (204). Packet processor 47N next encapsulates the packet with an L2 header to direct the packet to a WLC or AP of WLAN access network, where the L2 header also include a VLAN tag identifying the specified VLAN (206). Ingress forwarding unit 47A then internally forwards, via switch 56, the encapsulated L2 packet to anchor forwarding unit 47A for output by IFCs 50A to WLAN access network 11 (208).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a wireless access gateway having an upstream interface for a mobility tunnel with a mobile gateway of a mobile service provider network and having a downstream interface for a wireless local area network (WLAN) access network, a packet from the mobile gateway by the upstream interface for the mobility tunnel, wherein the mobility tunnel conforms to a mobility tunneling protocol and transports, between the wireless access gateway and the mobile gateway, subscriber data traffic associated with an Access Point Name (APN);
   determining, by the wireless access gateway and based at least on the mobility tunnel, a virtual local area network (VLAN) of the WLAN access network that is uniquely associated, in the wireless access gateway, with a combination of the APN and the mobile gateway;
   forwarding, by the wireless access gateway to a wireless endpoint device, the packet on the VLAN of the WLAN access network;
   prior to receiving the packet, establishing a subscriber session for the wireless endpoint device;
   allocating, by the wireless access gateway, a VLAN identifier for the VLAN from a plurality of VLAN identifiers for the wireless access gateway to associate the VLAN with the combination of the APN and the mobile gateway;
   receiving, by the wireless access gateway from an Authentication, Authorization, and Accounting (AAA) server using an AAA protocol, a suggested VLAN identifier for the subscriber session that is different than the VLAN identifier assigned by the wireless access gateway; and
   assigning, by the wireless access gateway in place of the suggested VLAN identifier, the VLAN identifier to the subscriber session for use by the wireless access gateway for forwarding downstream subscriber data traffic associated with the subscriber session on the WLAN access network.

2. The method of claim 1, wherein determining the VLAN comprises:
determining, by the wireless access gateway and using parameters of the upstream interface, a session context for the subscriber session associated with the packet; and reading the session context to determine the VLAN identifier for the VLAN.

3. The method of claim 1, further comprising:
receiving, by the wireless access gateway and from the wireless endpoint device, an access request; and
determining, by the wireless access gateway, an APN for the access request, wherein the APN for the access request is the APN associated with subscriber data traffic transported by the mobility tunnel, and
wherein allocating the VLAN identifier comprises allocating a unique VLAN identifier for the APN for the access request.

4. The method of claim 1, further comprising:
receiving, by the wireless access gateway and from the wireless endpoint device, an access request;
determining, by the wireless access gateway, an APN for the access request, wherein the APN for the access request is the APN associated with subscriber data traffic transported by the mobility tunnel; and
resolving the APN for the access request to a layer 3 (L3) address of the mobile gateway, wherein allocating the VLAN identifier comprises allocating a unique VLAN identifier for a combination of the APN for the access request and the L3 address of the mobile gateway.

5. The method of claim 1,
wherein the wireless endpoint device comprises a first wireless endpoint device having a layer 3 (L3) packet data protocol (PDP) address, wherein a second wireless endpoint device wireless endpoint device having the same L3 PDP address is attached to the WLAN access network, and
wherein the VLAN allows the WLAN access network to determine the packet is associated with the first wireless endpoint device and not the second wireless endpoint device.

6. The method of claim 1, wherein the mobility tunneling protocol comprises one of General Packet Radio Service (GPRS) Tunneling Protocol (GTP) or Proxy Mobile Internet Protocol (PMIP).

7. The method of claim 1, wherein the packet comprises a first packet, the method further comprising:
receiving, by the wireless access gateway and from the wireless endpoint device, a second packet on the VLAN of the WLAN access network;
determining, by the wireless access gateway and using a combination of source packet data protocol (PDP) address of a layer 3 (L3) portion of the second packet and a VLAN identifier for the VLAN, a session context for a subscriber session associated with the second packet; and reading the session context to determine the mobility tunnel and forwarding the second packet from the wireless access gateway to the mobile gateway using the mobility tunnel.

8. The method of claim 1, wherein the wireless access gateway comprises a S2a Mobility over General Packet Radio Service Tunneling Protocol (SaMOG)-based gateway.

9. A wireless access gateway comprising:
a forwarding unit having a packet processor and at least one network interface; a downstream interface for a wireless local area network (WLAN) access network; an upstream interface for a mobility tunnel to a mobile gateway of a mobile service provider network and having, wherein the mobility tunnel conforms to a mobility tunneling protocol and transports, between the wireless access gateway and the mobile gateway, subscriber data traffic associated with an Access Point Name (APN), wherein the upstream interface is configured to receive a packet from the mobile gateway,
wherein the packet processor is configured to determine, based at least on the mobility tunnel, a virtual local area network (VLAN) of the WLAN access network that is uniquely associated, in the wireless access gateway, with a combination of the APN and the mobile gateway, and
wherein the packet processor is configured to forward, to a wireless endpoint device, the packet on the VLAN of the WLAN access network; and
a subscriber management service unit configured to, prior to the upstream interface receiving the packet, establish a subscriber session for the wireless endpoint device,
wherein the subscriber management service unit is configured to receive, from an Authentication, Authorization, and Accounting (AAA) server using an AAA protocol, a suggested VLAN identifier for the subscriber session, and
wherein the subscriber management service unit is configured to allocate a VLAN identifier for the VLAN from a plurality of VLAN identifiers for the wireless access gateway to associate the VLAN with the combination of the APN and the mobile gateway, wherein the VLAN identifier allocated by the subscriber management service unit is different than the suggested VLAN identifier,
wherein the subscriber management service unit is configured to assign the VLAN identifier to the subscriber session in place of the suggested VLAN identifier for use by the wireless access gateway for forwarding downstream subscriber data traffic associated with the subscriber session on the WLAN access network.

10. The wireless access gateway of claim 9, wherein the packet processor is configured to determine the VLAN by determining, using parameters of the upstream interface, a session context for the subscriber session associated with the packet and reading the session context to determine the VLAN identifier for the VLAN.

11. The wireless access gateway of claim 9,
wherein the subscriber management service unit is configured to receive, from the wireless endpoint device, an access request,
wherein the subscriber management service unit is configured to determine an APN for the access request, wherein the APN for the access request is the APN associated with subscriber data traffic transported by the mobility tunnel, and
wherein the subscriber management service unit is configured to allocate the VLAN identifier by allocating a unique VLAN identifier for the APN for the access request.

12. The wireless access gateway of claim 9, further comprising:
wherein the subscriber management service unit is configured to receive, from the wireless endpoint device, an access request, wherein the subscriber management service unit is configured to determine an APN for the access request, wherein the APN for the access request is the APN associated with subscriber data traffic transported by the mobility tunnel, wherein the subscriber management service unit is configured to resolve the APN for the access request to a layer 3 (L3) address of the mobile gateway, and wherein the subscriber management service unit is configured to allocate the VLAN identifier by allocating a unique VLAN identifier for a combination of the APN for the access request and the L3 address of the mobile gateway.

13. The wireless access gateway of claim 9, wherein the mobility tunneling protocol comprises one of General Packet Radio Service (GPRS) Tunneling Protocol (GTP) or Proxy Mobile Internet Protocol (PMIP).

14. The wireless access gateway of claim 9,
wherein the packet comprises a first packet,
wherein the downstream interface is configured to receive, from the wireless endpoint device, a second packet on the VLAN of the WLAN access network,
wherein the packet processor is configured to determine, using a combination of source packet data protocol (PDP) address of a layer 3 (L3) portion of the second packet and a VLAN identifier for the VLAN, a session context for a subscriber session associated with the second packet, and
wherein the packet processor is configured to read the session context to determine the mobility tunnel and forward the second packet to the mobile gateway using the mobility tunnel.

15. The wireless access gateway of claim 9, wherein the wireless access gateway comprises a S2a Mobility over General Packet Radio Service Tunneling Protocol (SaMOG)-based gateway.

16. A non-transitory computer-readable medium comprising instructions for causing one or more programmable processors to:
receive, by a wireless access gateway having an upstream interface for a mobility tunnel to a mobile gateway of a mobile service provider network and having a downstream interface for a wireless local area network (WLAN) access network, a packet from the mobile gateway by the upstream interface for the mobility tunnel, wherein the mobility tunnel conforms to a mobility tunneling protocol and transports, between the wireless access gateway and the mobile gateway, subscriber data traffic associated with an Access Point Name (APN);
determine, by the wireless access gateway and based at least on the mobility tunnel, a virtual local area network (VLAN) of the WLAN access network that is uniquely associated, in the wireless access gateway, with a combination of the APN and the mobile gateway;
forward, by the wireless access gateway to a wireless endpoint device, the packet on the VLAN of the WLAN access network;
prior to receiving the packet, establish a subscriber session for the wireless endpoint device;
allocate, by the wireless access gateway, a VLAN identifier for the VLAN from a plurality of VLAN identifiers for the wireless access gateway to associate the VLAN with the combination of the APN and the mobile gateway;
receive, by the wireless access gateway from an Authentication, Authorization, and Accounting (AAA) server using an AAA protocol, a suggested VLAN identifier for the subscriber session that is different than the VLAN identifier assigned by the wireless access gateway; and
assign, by the wireless access gateway in place of the suggested VLAN identifier, the VLAN identifier to the subscriber session for use by the wireless access gateway for forwarding downstream subscriber data traffic associated with the subscriber session on the WLAN access network.

17. The non-transitory computer-readable medium of claim 16, wherein instructions for causing one or more programmable processors to determine the VLAN comprises instructions for causing one or more programmable processors to:
determine, by the wireless access gateway and using parameters of the upstream interface, a session context for the subscriber session associated with the packet; and read the session context to determine the VLAN identifier for the VLAN.

18. The non-transitory computer-readable medium of claim 16, wherein the instructions further cause one or more programmable processors to:
receive, by the wireless access gateway and from the wireless endpoint device, an access request; and
determine, by the wireless access gateway, an APN for the access request, wherein the APN for the access request is the APN associated with subscriber data traffic transported by the mobility tunnel, and
wherein instructions for causing one or more programmable processors to allocate the VLAN identifier comprises instructions for causing one or more programmable processors to allocate a unique VLAN identifier for the APN for the access request.

19. The non-transitory computer-readable medium of claim 16, wherein the instructions further cause one or more programmable processors to:
receive, by the wireless access gateway and from the wireless endpoint device, an access request;
determine, by the wireless access gateway, an APN for the access request, wherein the APN for the access request is the APN associated with subscriber data traffic transported by the mobility tunnel; and
resolve the APN for the access request to a layer 3 (L3) address of the mobile gateway, wherein instructions for causing one or more programmable processors to allocate the VLAN identifier comprises instructions for causing one or more programmable processors to allocate a unique VLAN identifier for a combination of the APN for the access request and the L3 address of the mobile gateway.

20. The non-transitory computer-readable medium of claim 16, wherein the packet comprises a first packet and wherein the instructions further cause one or more programmable processors to:
receive, by the wireless access gateway and from the wireless endpoint device, a second packet on the VLAN of the WLAN access network;
determine, by the wireless access gateway and using a combination of source packet data protocol (PDP) address of a layer 3 (L3) portion of the second packet and a VLAN identifier for the VLAN, a session context for a subscriber session associated with the second packet; and read the session context to determine the mobility tunnel and forwarding the second packet from the wireless access gateway to the mobile gateway using the mobility tunnel.

* * * * *